United States Patent
Matsui

(10) Patent No.: US 8,280,440 B2
(45) Date of Patent: Oct. 2, 2012

(54) MOBILE TERMINAL DEVICE CAPABLE OF RESTORING AN ORIGINAL FUNCTION

(75) Inventor: Takayuki Matsui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 911 days.

(21) Appl. No.: 11/997,936

(22) PCT Filed: Aug. 9, 2006

(86) PCT No.: PCT/JP2006/315761
§ 371 (c)(1),
(2), (4) Date: Feb. 5, 2008

(87) PCT Pub. No.: WO2007/020857
PCT Pub. Date: Feb. 22, 2007

(65) Prior Publication Data
US 2010/0285840 A1      Nov. 11, 2010

(30) Foreign Application Priority Data

Aug. 19, 2005  (JP) ................................ 2005-238788

(51) Int. Cl.
*H04B 1/38* (2006.01)

(52) U.S. Cl. ......... 455/558; 455/566; 709/221; 345/172
(58) Field of Classification Search ................... 455/558
See application file for complete search history.

(56) References Cited

U.S. PATENT DOCUMENTS

| | | | |
|---|---|---|---|
| 5,404,580 A | | 4/1995 | Simpson |
| 5,630,159 A | * | 5/1997 | Zancho ........................ 709/221 |
| 5,940,773 A | * | 8/1999 | Barvesten ..................... 455/558 |
| 6,628,971 B1 | * | 9/2003 | Yoon et al. ..................... 455/566 |
| 6,738,047 B2 | * | 5/2004 | Kobayashi ..................... 345/172 |
| 2002/0045465 A1 | * | 4/2002 | Kishida et al. ................ 455/566 |
| 2002/0048460 A1 | | 4/2002 | Kitawaki |
| 2002/0169004 A1 | * | 11/2002 | Thil et al. ..................... 455/558 |
| 2003/0224823 A1 | * | 12/2003 | Hurst et al. ................... 455/558 |
| 2006/0007319 A1 | | 1/2006 | Kitawaki |

FOREIGN PATENT DOCUMENTS

| | | |
|---|---|---|
| EP | 0936790 A1 | 8/1999 |
| GB | 2270442 A | 3/1994 |
| JP | 10-143269 | 5/1998 |
| JP | 2002-132374 | 5/2002 |
| JP | 2002-368871 | 12/2002 |
| JP | 2005-086253 | 3/2005 |
| JP | 2005-204039 | 7/2005 |
| WO | 98/36546 | 8/1998 |

OTHER PUBLICATIONS

International Search Report Dated Sep. 12, 2006.
Using Phonebook.
Supplemental European Search Report mailed Apr. 7, 2010, in corresponding European Patent Application No. 06782577.8.

* cited by examiner

*Primary Examiner* — Charles Shedrick
(74) *Attorney, Agent, or Firm* — Seed IP Law Group PLLC

(57) ABSTRACT

A mobile terminal device that executes a function setting operation is disclosed. When a memory card that stores various file types is inserted into the mobile terminal device, a decision processing portion reads identification information of the memory card and compares the identification information with stored identification information in a storing portion. If the read identification information and the stored identification information coincide, a function setting controlling portion executes a resetting of a display or of a sound function of the mobile terminal device by using the various file types stored in the memory card.

12 Claims, 3 Drawing Sheets

MOBILE TERMINAL DEVICE CAPABLE OF RESTORING AN ORIGINAL FUNCTION

TECHNICAL FIELD

The present invention relates to a mobile terminal device for executing a function setting by using a function setting file stored in a storage medium that can be inserted/removed into/from a connector or a slot.

BACKGROUND ART

In the recent mobile terminal devices such as cellular phone, PDA, and the like, it is common with users to set the function based on the user's customization. For example, an image such as illustration, animation, or the like can be set on a phone call standby screen of a liquid crystal display as a wallpaper to meet the user's taste.

In the related art, the wallpaper for the purpose of customization is stored in a memory card as a JPEG image file, then the image file used for the setting is copied from the memory card inserted into a predetermined slot to a memory in the terminal device once in setting the wallpaper, and then the wallpaper is set by the predetermined user's operation (set forth in Non-Patent Literature 1).

Non-Patent Literature 1: Mova P506iC Instruction Manual p. 84

DISCLOSURE OF THE INVENTION

Problems that the Invention is to Solve

However, such a problem exists that the copied image file strains a memory resource of the terminal device, and the above approach is not preferable. Also, such a situation may be considered that, because of an issue of a copyright, or the like, a restriction is imposed on the copying of the file in the memory card. Therefore, there are fears that the above approach cannot be used in future.

Meanwhile, there is an example that the image file used for the setting is read directly from the memory card, in setting the wallpaper on the standby screen, or the like. However, according to this method, when the user takes the inserted memory card out of the terminal device, such user has to exclude the image file used once to set the wallpaper from the set object. Thus, there is such a problem that the wallpaper being set should be deleted. Also, in order to set the same wallpaper as preceding one by inserting the memory card being pulled out once into the terminal device again and using the same image file, complicated operations are required such that the user follows the same procedures once again in the terminal device to do the setting over again.

The present invention has been made in view of the above circumstances, and it is an object of the present invention to provide a mobile terminal device capable of automatically restoring an original function setting to neglect a resetting and also capable of lessening the user's operational burden when insertion/removal of the same memory card are repeated in the mobile terminal device that executes a function setting by using a memory card.

Means for Solving the Problems

A mobile terminal device of the present invention connectable to a storage medium with identification information, includes a function setting controlling portion for executing a predetermined function setting by using data read from the storage medium; a function setting information storing portion for storing function setting information set by the function setting controlling portion; and an identification information storing portion for storing identification information of the storage medium connected to the mobile terminal device; wherein, if it is decided that the identification information of the reconnected storage medium coincides with the identification information stored in the identification information storing portion, the function setting controlling portion executes the function setting based on the function setting information stored in the function setting information storing portion.

According to this configuration, the original function setting can be restored automatically when a connection state is changed by inserting/removing the same storage medium, or the like. Therefore, the resetting of the function can be neglected and also the user's operational burden can be lessened. Also, the original function setting can be restored automatically similarly when the power supply is switched by turning ON/OFF while the storage medium is being inserted. In other words, the present invention can be applied to the case where a communication state between the mobile terminal device and the storage medium is switched between a shutdown state and an open state.

Also, as one mode of the present invention, in the mobile terminal device, if it is decided that the identification information of the reconnected storage medium does not coincide with the identification information stored in the identification information storing portion, the identification information storing portion updates the identification information stored in the identification information storing portion with the identification information of the reconnected storage medium.

According to this configuration, the function setting is done by using the file stored in the reinserted storage medium, and also the original function setting can be restored automatically when insertion/removal of the same storage medium are repeated. Therefore, the resetting of the function can be neglected and also the user's operational burden can be lessened.

Also, as one mode of the present invention, in the mobile terminal device, if it is decided that the identification information of the reconnected storage medium does not coincide with the identification information stored in the identification information storing portion, the identification information storing portion holds the identification information stored in the identification information storing portion.

According to this configuration, the original function setting can be restored automatically only when insertion/removal of the same storage medium are repeated. Therefore, the resetting of the function can be neglected and also the user's operational burden can be lessened.

Also, as one mode of the present invention, in the mobile terminal device, the storage medium is a memory card with identification information.

According to this configuration, the original function setting can be restored automatically only when insertion/removal of the same storage medium are repeated. Therefore, the resetting of the function can be neglected and also the user's operational burden can be lessened.

Advantages of the Invention

According to the mobile terminal device of the present invention, the mobile terminal device capable of automatically restoring the original function setting to omit the resetting and also capable of lessening the user's operational burden when insertion/removal of the same memory card are repeated in the mobile terminal device that executes the function setting by using the memory card can be provided.

Figure 1:
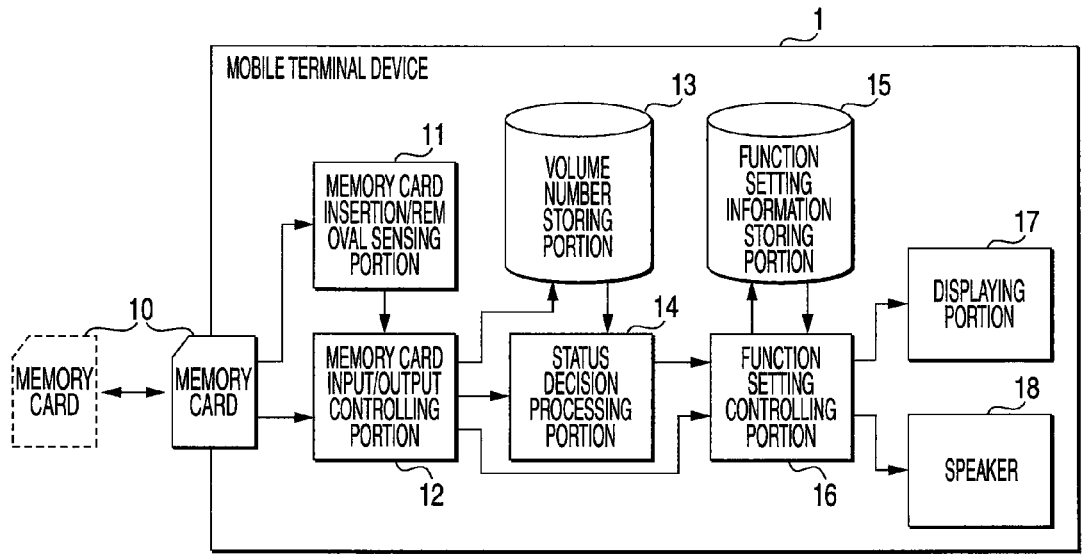
FIG. 1 A view showing a schematic configuration of a mobile terminal device according to an embodiment of the present invention.

DESCRIPTION OF REFERENCE NUMERALS 1 mobile terminal device
10 memory card
11 memory card insertion/removal sensing portion
12 memory card input/output controlling portion
13 volume number storing portion
14 status decision processing portion
15 function setting information storing portion
16 function setting controlling portion
17 displaying portion
18 speaker

BEST MODE FOR CARRYING OUT THE INVENTION

An embodiment of a mobile terminal device according to the present invention will be explained with reference to the drawings hereinafter. In the present embodiment, the case where a memory card that can be inserted into and removed from a predetermined slot of the mobile terminal device is used and a wallpaper is set on a standby display screen will be illustrated. First, an outline of the mobile terminal device according to the embodiment of the present invention will be explained hereunder.

FIG. 1 is a view showing a schematic configuration of a mobile terminal device according to an embodiment of the present invention. A mobile terminal device 1 is constructed to include a memory card insertion/removal sensing portion 11 for sensing an insertion/removal of a memory card 10 into/from a predetermined slot, a memory card input/output controlling portion 12 for controlling a reading of a volume number of the memory card 10 and file information, a volume number storing portion 13 composed of a nonvolatile memory for storing the volume number of the memory card 10, a status decision processing portion 14 for deciding whether or not the volume number of the reinserted memory card 10 coincides with the volume number stored in the volume number storing portion 13, a function setting information storing portion 15 composed of a nonvolatile memory for storing function setting type information and function setting value information such as ID number, name, etc. of a file stored previously in the memory card 10 and used to set a wallpaper, a function setting controlling portion 16 for controlling a setting of the wallpaper, a displaying portion 17 for displaying a standby screen of the set wallpaper, and a speaker 18 for outputting a phone melody.

In this case, the volume number of the memory card has a 16-byte information size, and the code number of the card manufacturing company and the manufacture's serial number are recorded uniquely every card. Also, in the memory card of the type to which the identification number such as the volume number, or the like is not affixed, when the function setting should be done by using file information in the card, the number may be generated automatically based on the data and time information and recorded in the card and such number may be used in place of the volume number. At this time, any data size may be selected if it has an amount of information enough to identify the volume.

Also, as the nonvolatile memory constituting the volume number storing portion 13 and the function setting information storing portion 15, an internal memory such as FROM, or the like provided to the mobile terminal device 1, or a storage medium such as a hard disk, or the like can be used.

Figure 2:
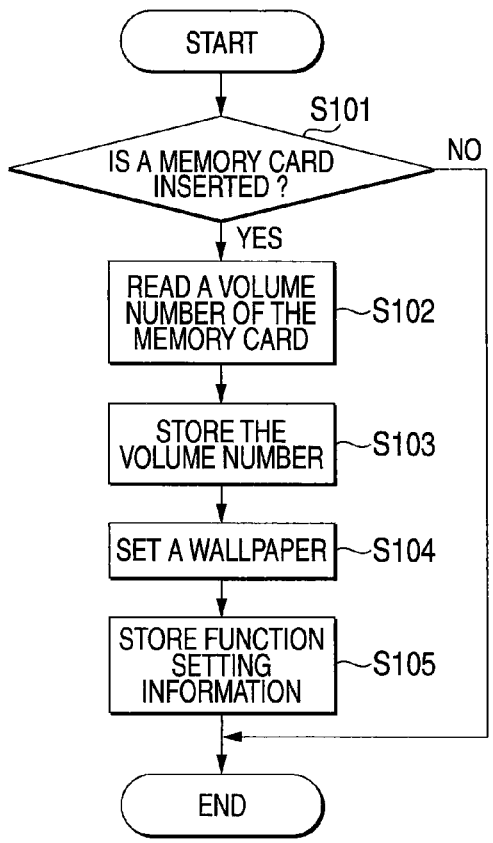
FIG. 2 A flowchart explaining operational procedures of initial setting in inserting a memory card into the mobile terminal device according to the embodiment of the present invention.

Next, an operation of the mobile terminal device 1 constructed as above will be explained with reference to flowcharts shown in FIG. 2 to FIG. 4 hereunder. FIG. 2 is a flowchart explaining operational procedures of the mobile terminal device 1 in the initial setting during which a volume number and functional set value information are registered after the memory card 10 is inserted.

First, an operation of the mobile terminal device 1 in setting the wallpaper will be explained hereunder. FIG. 2 is a flowchart explaining operational procedures of the mobile terminal device 1 in doing the wallpaper setting after the memory card 10 is inserted.

In step S101, the memory card insertion/removal sensing portion 11 senses whether or not the memory card 10 is being inserted. If it is sensed that the memory card 10 is being inserted, the memory card insertion/removal sensing portion 11 instructs the memory card input/output controlling portion 12 to read the volume number of the memory card 10.

The memory card input/output controlling portion 12, when received the instruction, reads the volume number recorded on the memory card 10 (step S102), and stores the volume number in the volume number storing portion 13 (step S103). Also, the memory card input/output controlling portion 12 reads the particular JPEG image file information used in setting the wallpaper from the memory card 10, and sends the image file information to the function setting controlling portion 16.

The function setting controlling portion 16 sets the wallpaper on the displaying portion 17 by using the sent JPEG image file information (step S104), and also stores function setting information in the function setting information storing portion 15 while linking such information with the volume number stored in the volume number storing portion 13 (step S105). This function setting information gives various information necessary for the wallpaper setting, and contains identification information such as function setting type information, file name used in the wallpaper setting, file ID number, and the like.

As described above, the volume number storing portion 13 and the function setting information storing portion 15 are composed of the nonvolatile memory. Therefore, the volume number of the memory card 10 and the function setting information are held in their linked state after the memory card 10 is pulled out.

Next, an operation of the mobile terminal device 1 taken when the memory card 10 is inserted again after the inserted memory card 10 is removed will be explained hereunder. FIG. 3 is a flowchart explaining operational procedures of the mobile terminal device 1 in setting the wallpaper after the memory card 10 is inserted again.

In step S201, the memory card insertion/removal sensing portion 11 senses whether or not the memory card 10 is being inserted. If it is sensed that the memory card 10 is being inserted, the memory card insertion/removal sensing portion 11 instructs the memory card input/output controlling portion 12 to read the volume number of the memory card 10.

The memory card input/output controlling portion 12 reads the volume number recorded on the inserted memory card 10 and notifies the status decision processing portion 14 of the volume number (step S202). The status decision processing portion 14 compares both volume numbers mutually to decide whether or not the read volume number coincides with the volume number of the precedingly inserted memory card 10 stored in the volume number storing portion 13 (step S203).

As a decision result, if both volume numbers coincide mutually, the status decision processing portion 14 instructs the function setting controlling portion 16 to restore the wallpaper setting that has been done based on the preceding volume number. The function setting controlling portion 16 reads the function setting information that is stored in the function setting information storing portion 15 to be linked with the preceding volume number (step S204).

In turn, the status decision processing portion 14 decides whether or not the JPEG image file information as the wallpaper setting object is contained in the memory card 10 inserted this time (step S205). As a result, if it is decided that the file information as the setting object is contained in the memory card 10, the status decision processing portion 14 instructs the memory card input/output controlling portion 12 to read the file information as the setting object (step S206). The function setting controlling portion 16 resets the wallpaper on the displaying portion 17 in compliance with the function setting information by using the read file information (step S207).

In contrast, in step S203, if it is decided that the volume number of the memory card 10 inserted this time does not coincide with the volume number of the memory card 10 stored in the volume number storing portion 13, the status decision processing portion 14 overwrites the volume number of the memory card 10 inserted this time on the volume number of the preceding memory card 10 stored in the volume number storing portion 13 to store (step S208). Then the process is ended. Also, in step S205, it is decided that the image file information as the setting object is not contained in the memory card 10, similarly the status decision processing portion 14 overwrites the volume number of the memory card 10 inserted this time on the volume number of the preceding memory card 10 stored in the volume number storing portion 13 to store (step S208). Then the process is ended.

In the present embodiment, either of the operation with the process in step S208 and the operation without the same process can be selected. FIG. 4 is a flowchart explaining operational procedures when the volume number of the memory card 10 inserted this time does not coincide with the volume number of the memory card 10 inserted precedingly.

Figure 3:
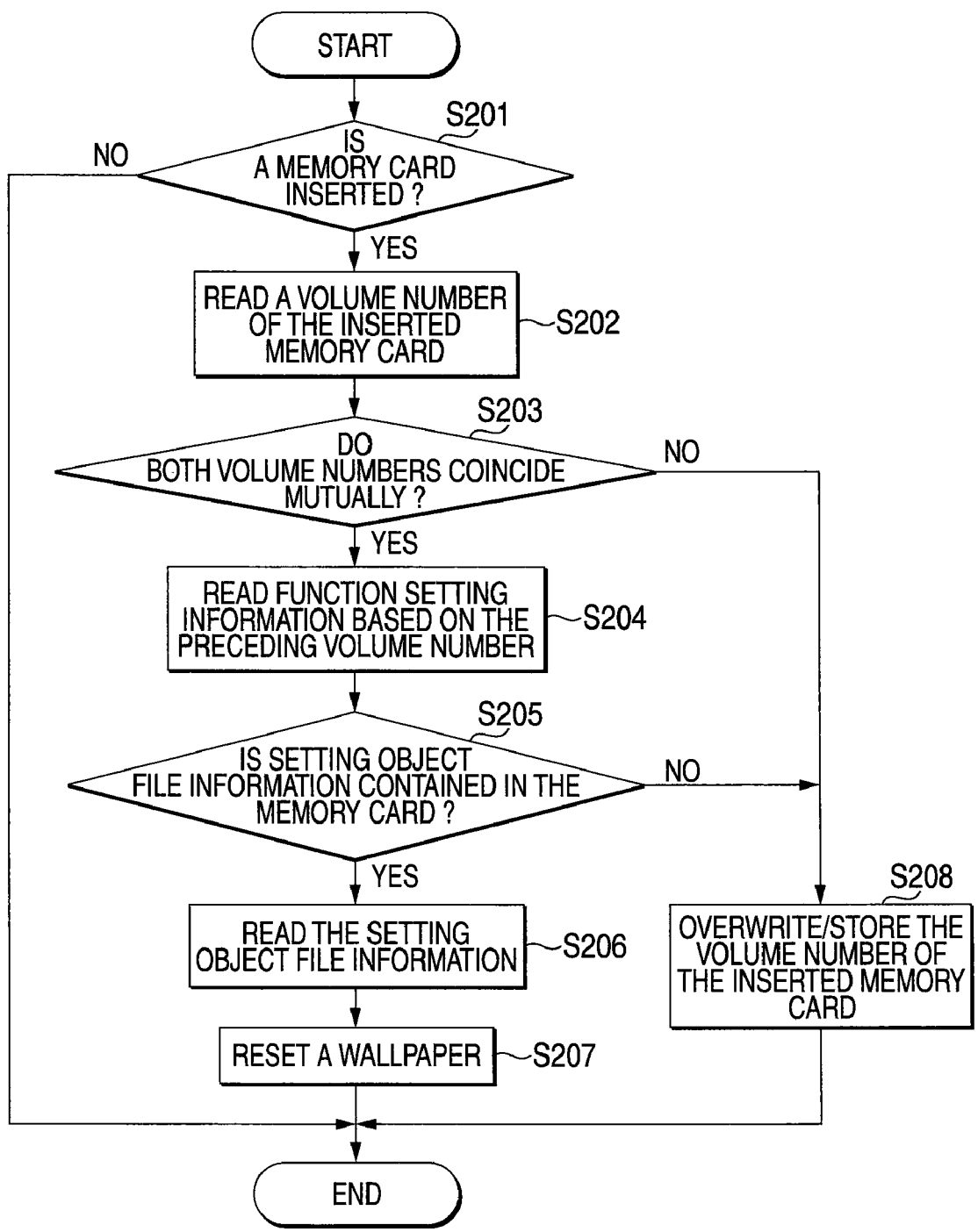
FIG. 3 A flowchart explaining operational procedures in reinserting the memory card in the mobile terminal device according to the embodiment of the present invention.
Figure 4:
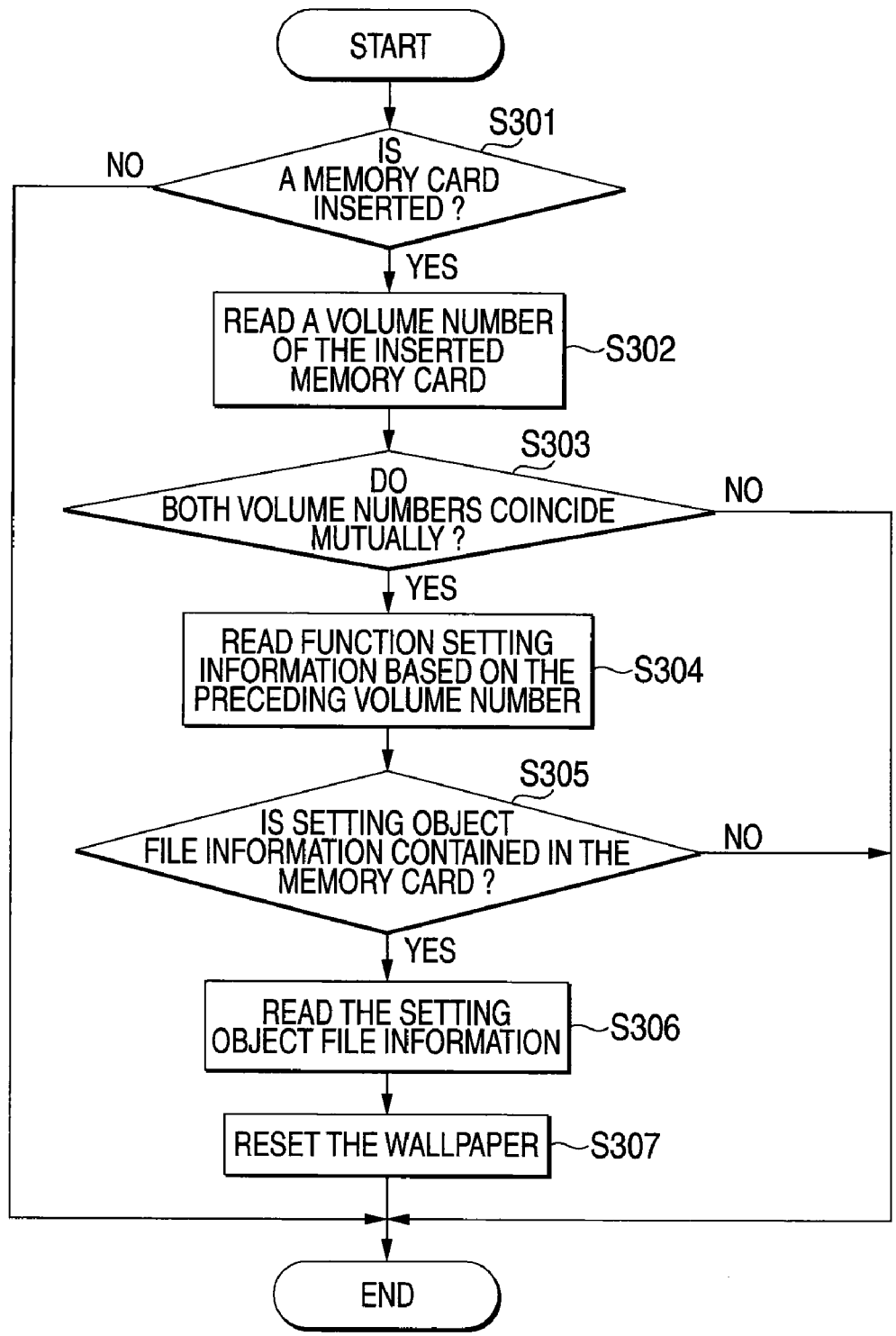
FIG. 4 A flowchart explaining other operational procedures in reinserting the memory card in the mobile terminal device according to the embodiment of the present invention.

In FIG. 4, procedures of the processes in steps S301 to S307 are similar to those of the processes in steps S207 to S207 in FIG. 3, and thus their explanation will be omitted herein.

In step S303, if it is decided that the volume number of the memory card 10 inserted this time does not coincide with the volume number of the memory card 10 stored in the volume number storing portion 13, no process is taken and then the process is ended. Also, in step S304, if it is decided that the image file information as the setting object is not contained in the memory card 10, no process is taken and then the process is ended.

Here, in the above operational procedures of the mobile terminal device, the wallpaper setting is explained as the function setting. But the setting of the phone melody to sound the speaker 18 shown in FIG. 1, the image setting on the phone book, and the like can be done by the similar procedures. Also, the function of starting automatically the application stored in the memory card in turning ON a power supply can be set.

As explained above, according to such mobile terminal device of the embodiment of the present invention, the volume number is read from the inserted memory card 10 and stored in the volume number storing portion 13, and also the particular JPEG image file stored in the memory card 10 is read and the wallpaper setting is done by the function setting controlling portion 16. Also, the function setting information necessary for the wallpaper setting is stored in the function setting information storing portion 15 to be linked with the volume number stored in the volume number storing portion 13.

Then, when the memory card is inserted again after it is pulled out once, the status decision processing portion 14 reads the volume number and compares this number with the volume number stored in the volume number storing portion 13. If both volume numbers coincide with each other, the memory card input/output controlling portion 12 reads the image file used in set the wallpaper precedingly from the reinserted memory card, and also the function setting controlling portion 16 executes the resetting of the wallpaper while referring to the function setting information stored in the function setting information storing portion 15.

Accordingly, the original wallpaper setting restores automatically when the memory card is inserted/removed. Therefore, troublesome operations required to do the setting over again are not needed, and the user's operational burden can be lessened enormously.

In the present embodiment, an example in which the present invention is applied to the mobile terminal device such as the cellular phone, PDA, or the like is explained. But the present invention is not limited to this example. It is needless to say that the present invention can be applied to the terminal device such as the personal computer that executes the function setting by using an external memory device having the nonvolatile memory, and the like, for example.

The present invention is explained in detail with reference to the particular embodiment. But it is apparent for those skilled in the art that various variations and modifications can be applied without departing from a spirit and a scope of the present invention.

This application is based upon Japanese Patent Application (Patent Application No. 2005-238788) filed on Aug. 19, 2005; the contents of which are incorporated herein by reference.

INDUSTRIAL APPLICABILITY

The mobile terminal device of the present invention possesses such an advantage that the mobile terminal device capable of automatically restoring the original function setting to omit the resetting and also capable of lessening the user's operational burden when insertion/removal of the same memory card are repeated in the mobile terminal device that executes the function setting by using the memory card can be provided, and is useful to the terminal device such as cellular phone, PDA, personal computer, or the like.

The invention claimed is:

1. A mobile terminal device comprising:
a detection portion configured to detect an inserted insertion and removal of memory cards;
a display portion configured to display images; a storing portion configured to store wallpaper function setting information used to display an image file stored in a first inserted memory card as wallpaper of a standby screen on the display portion;
a status decision processing portion configured to determine whether or not a second inserted memory card after removal of the first inserted memory card, as detected by the detection portion, is the same as the first inserted memory card; and
a controlling portion that causes the display portion, when the status decision processing portion determines that the second inserted memory card is the same as the first inserted memory card, to display the image file stored in the second inserted memory card as wallpaper of the standby screen based on the function setting information stored in the storing portion;
wherein the status decision processing portion determines whether or not the second inserted memory card is the same as the first inserted memory card by comparing an identification number of the first inserted memory card, which is stored in the storing portion, with an identification number of the second inserted memory card; and
wherein the identification number of the first inserted memory card is automatically generated based on time information associated with the wallpaper function setting information.

2. The mobile terminal device of claim 1, wherein the display portion is further configured to display the image file stored in the first inserted memory card as the wallpaper without storing the image file stored in the first inserted memory card in the mobile terminal device while the detection portion detects insertion of the first inserted memory card.

3. The mobile terminal device of claim 1, wherein the display portion is further configured to directly read and display the image file stored in the first inserted memory card as the wallpaper while the detection portion detects insertion of the first inserted memory card.

4. The mobile terminal device of claim 1, further comprising:
a function setting portion configured to set the wallpaper function setting information used to display the image file stored in the first inserted memory card as the wallpaper.

5. The mobile terminal device of claim 1, wherein when the detection portion detects removal of the first inserted memory card, the image file stored in the first inserted memory card is no longer displayed as the wallpaper on the display portion.

6. The mobile terminal device of claim 1, wherein the identification number of the first inserted memory card is a volume number pre-recorded in the first inserted memory card.

7. A mobile terminal device, comprising:
a detection portion configured to detect insertion and removal of memory cards;
a speaker configured to output sounds;
a storing portion configured to store phone melody function setting information used to output a sound file stored in a first inserted memory card as a phone melody via the speaker;
a status decision processing portion configured to determine whether or not a second inserted memory card after removal of the first inserted memory card, as detected by the detecting portion, is the same as the first inserted memory card; and
a controlling portion that causes the speaker, when the status decision processing portion determines that the second inserted memory card is the same as the first inserted memory card, to output the sound file stored in the second inserted memory card as the phone melody based on the phone melody function setting information stored in the storing portion;
wherein the status decision processing portion determines whether or not the second inserted memory card is the same as the first inserted memory card by comparing an identification number of the first inserted memory card, which is stored in the storing portion, with an identification number of the second inserted memory card; and
wherein the identification number of the first inserted memory card is automatically generated based on time information associated with the phone melody function setting information.

8. The mobile terminal device of claim 7, wherein the speaker is further configured to output the sound file stored in the first inserted memory card as the phone melody without storing the sound file stored in the first inserted memory card in the mobile terminal device while the detection portion detects insertion of the first inserted memory card.

9. The mobile terminal device of claim 7, wherein the speaker is further configured to directly read and output the sound file stored in the first inserted memory card as the phone melody while the detection portion detects insertion of the first inserted memory card.

10. The mobile terminal device of claim 7, further comprising:
a function setting portion configured to set the phone melody function setting information used to output the sound file stored in the first inserted memory card as the phone melody.

11. The mobile terminal device of claim 7, wherein when the detection portion detects removal of the first inserted memory card, the sound file stored in the first inserted memory card is no longer used as the phone melody.

12. The mobile terminal device of claim 7, wherein the identification number of the first inserted memory card is a volume number pre-recorded in the first inserted memory card.

* * * * *

UNITED STATES PATENT AND TRADEMARK OFFICE
CERTIFICATE OF CORRECTION

PATENT NO.       : 8,280,440 B2
APPLICATION NO.  : 11/997936
DATED            : October 2, 2012
INVENTOR(S)      : Takayuki Matsui It is certified that error appears in the above-identified patent and that said Letters Patent is hereby corrected as shown below:

On the Title Page Item (57):
"A mobile terminal device that executes a function setting operation is disclosed. When a memory card that stores various file types is inserted into the mobile terminal device, a decision processing portion reads identification information of the memory card and compares the identification information with stored identification information in a storing portion. If the read identification information and the stored identification information coincide, a function setting controlling portion executes a resetting of a display or of a sound function of the mobile terminal device by using the various file types stored in the memory card." should read, --There is a mobile terminal device that executes a function setting operation. When a memory card that stores various file types is inserted, a decision processing portion reads identification information of the memory card and compares the identification information with stored identification information in a storing portion. If the read identification information and the stored identification information coincide, a function setting controlling portion executes a resetting of a display or of a sound function of the mobile terminal device by using the various file types stored in the memory card.--.

In the Claims:

Column 7, Lines 3-4:
"a detection portion configured to detect an inserted insertion and removal of memory cards;" should read, --a detection portion configured to detect insertion and removal of memory cards;--.

Column 7, Line 5:
"a display portion configured to display images; a storing" should read,
--a display portion configured to display images;
   a storing--.

Column 7, Line 20:
"standby screen based on the function setting information" should read, --standby screen based on the wallpaper function setting information--.

Signed and Sealed this
Twenty-second Day of July, 2014

Michelle K. Lee
*Deputy Director of the United States Patent and Trademark Office*

Column 7, Lines 30-31:
"information associated with the wallpaper function setting information." should read, --information associated with the phone melody function setting information.--.

Column 8, Line 29:
"information associated with the phone melody function" should read, --information associated with the wallpaper function--.